United States Patent [19]

Huret, deceased et al.

[11] 4,407,599
[45] Oct. 4, 1983

[54] DEVICE FOR FIXING A DERAILLEUR ON A FRAME LUG

[75] Inventors: Roger Huret, deceased, late of Nanterre, France; by Alain P. B. Huret, legal representative, Bougival, France

[73] Assignee: Huret et ses Fils, Nanterre, France

[21] Appl. No.: 356,039

[22] Filed: Mar. 8, 1982

[30] Foreign Application Priority Data

Mar. 23, 1981 [FR] France .................. 81 05718

[51] Int. Cl.³ .................. B25G 3/00; F16D 1/00; F16G 11/00
[52] U.S. Cl. .................. 403/11; 403/188
[58] Field of Search .................. 403/11, 406, 408, 188; 411/531, 544, 546, 547; 52/489; 474/80-82

[56] References Cited

U.S. PATENT DOCUMENTS

| 992,338 | 5/1911 | Carpenter et al. | 403/188 X |
| 2,520,998 | 9/1950 | Cella | 403/188 X |
| 2,811,706 | 10/1957 | Logan | 403/188 X |
| 2,961,694 | 11/1960 | May | 403/188 X |
| 3,203,118 | 8/1965 | Bonie | 403/188 X |
| 3,319,918 | 5/1967 | Zibell | 52/489 X |
| 4,006,877 | 2/1977 | Niel | 403/188 X |

FOREIGN PATENT DOCUMENTS 2433102  2/1975  Fed. Rep. of Germany ...... 403/188

Primary Examiner—Wayne L. Shedd
Attorney, Agent, or Firm—Trexler, Bushnell & Wolters, Ltd.

[57] ABSTRACT

The invention overcomes the drawbacks of a conventional device employing a screw and a nut, in particular as concerns the mounting of the derailleur. This is achieved by providing on a support plate of the derailleur an elastically yieldable fastener which is permanently fixed on the support plate and adapted to cooperate with the frame lug so as to ensure that the support plate remains in position relative to the frame lug. The support plate further comprises means for centering the support plate relative to the frame lug.

9 Claims, 7 Drawing Figures

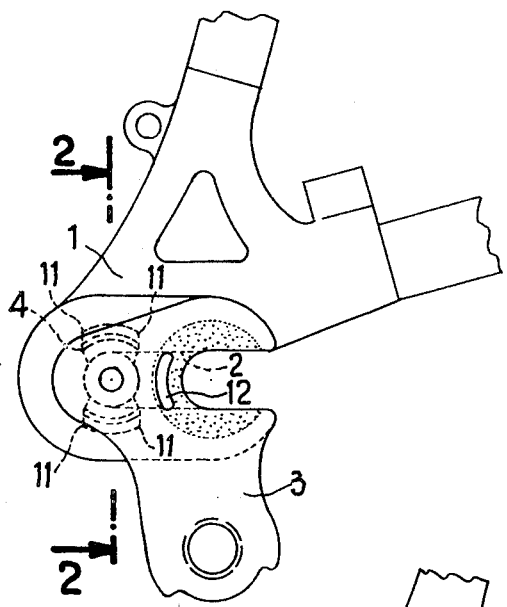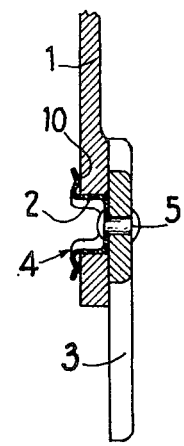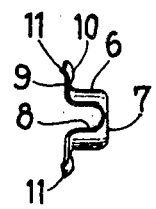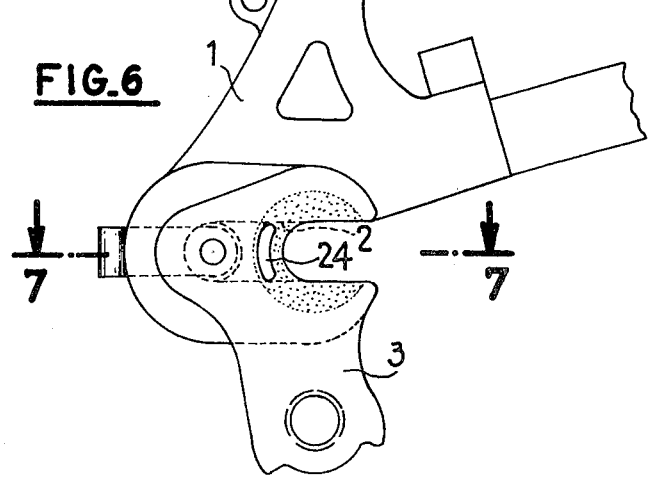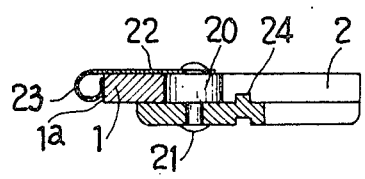

DEVICE FOR FIXING A DERAILLEUR ON A FRAME LUG

DESCRIPTION

The present invention relates to derailleurs for cycles and more particularly the mounting thereof on the frame.

It is known that a derailleur is usually carried by a support plate which is itself fixed to the lug of the rear frame of the bicycle. The mounting of the assembly formed by the derailleur and its support plate is carried out in two stages. First of all, this assembly is placed in position on the frame lug and fixed to the lug by means of a screw and nut device. Then, when the wheel hub is mounted in the frame, the support plate is fixed to the frame lug at the same time as the hub.

The fact of first of all fixing the support plate to the frame lug by means of a screw and nut device results in several drawbacks:

First of all, a special nut must be employed which must have two shoulders which ensure the guiding in the slot or the slideway of the frame lug, and two wings or ears which bear against the rear face of this frame lug. This nut is consequently relatively expensive since its manufacture involves a turning operation.

Another drawback results in the fact that, on the assembly of the derailleur and its support plate, there must be mounted on the latter the screw and nut which will subsequently fix the assembly to the frame lug. This consequently implies a first slight tightening of the nut and the screw followed, by an untightening, to permit the mounting of the assembly on the frame lug and a further tightening for fixing the assembly. Note that this second tightening operation is delicate since it requires the use of two spanners and it is necessary to ensure a correct positioning of the support plate relative to the frame lug. There is also a risk that, in the course of the various derailleur handling operations, the screw and the nut become untighted and detached from the support plate.

An object of the invention is to provide a device for mounting the derailleur and its support plate on the frame lug which avoids these various drawbacks and is simpler, cheaper and easier to mount.

This is achieved by providing on the support plate of the derailleur an elastically yieldable fastener which is permanently fixed thereto and adapted to cooperate with the frame lug for maintaining the support plate in position relative to the frame lug, the support plate further comprising means for centering it relative to the frame lug.

According to an embodiment, the elastically yieldable fastener comprises a body by which it is fixed to the support plate and two diametrally opposed branches which extend from the body and are adapted to cooperate frictionally with the frame lug.

The two branches preferably include a convex surface which is adapted to come into contact with the rear face of the frame lug, this convex surface extending preferably on an arc of a circle.

Also, preferably, the two branches include rounded edges so as to facilitate the engagement thereof on the frame lug.

According to another embodiment, the elastically yieldable fastener comprises an elastic strip carried by a stud fixed on the support plate, said elastically yieldable strip including a retaining surface adapted to elastically clip onto an edge of the frame lug.

The invention will be described in more detail hereinafter with reference to the accompanying drawings which are given solely by way of example and in which:

FIG. 1 is a side elevational view of a frame lug on which a derailleur support plate is mounted, FIG. 2 is a sectional view taken on line 2—2 of FIG. 1;

FIG. 3 is a side elevational view of the elastically yieldable fastener employed in the assembly of FIGS. 1 and 2;

FIG. 6 is a side elevational view of a modification, and

FIG. 7 is a sectional view taken on line 7—7 of FIG. 6.

Figure 4:
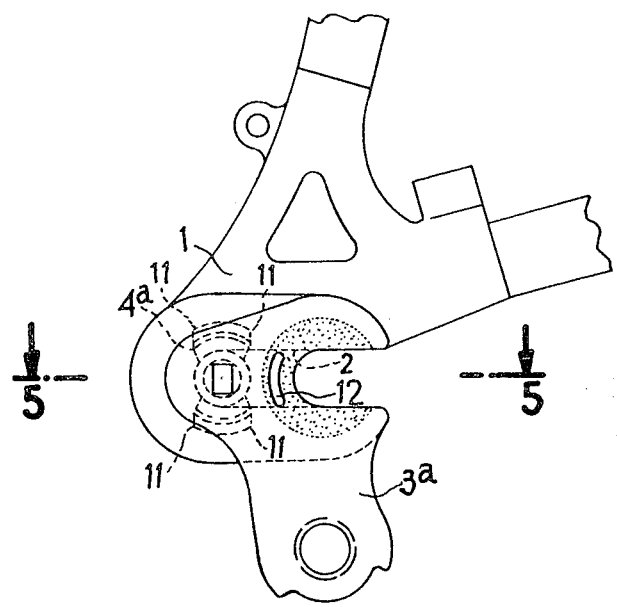
FIG. 4 is a view, similar to that of FIG. 1, of a modification.

FIG. 1 shows a rear frame lug 1, comprising a slot or slideway 2, in which must be fixed, on one hand, a derailleur support plate 3 and, on the other hand, the wheel hub (not shown).

The support plate carries an elastically yieldable fastener 4 fixed for example by a rivet 5, and adapted to ensure the fixing thereof on the frame lug. This fastener comprises a body 6 whose end wall 7 permits the fixing thereof on the plate 3, this end wall having in the presently-described embodiment a partly cylindrical shape. In fact, the body is formed by two portions of a cylinder separated by two notches 8. This body is extended by two symmetrical branches 9 which extend roughly radially and each include a convex portion 10 adapted to cooperate with the adjacent face of the frame lug. These two convex portions extend preferably on an arc of a circle centered on the axis of the rivet 5. Further, as shown in FIG. 3, the end edges or corners 11 of the two branches are rounded so as to facilitate the engagement of the support plate in the frame lug.

The fastener is made from spring steel.

The support plate 3 further comprises a portion 12 which projects from the side thereof facing the frame lug and is adapted to center the support plate relative to the frame lug.

Such an arrangement effectively overcomes the drawbacks of the conventional device. Indeed, the elastically yieldable fastener 4, which is of very simple and consequently cheap construction, is permanently fixed to the support plate so that all the tightening and untightening operations related to the use of a screw and nut device are avoided.

Further, the particular shape given to this fastener permits, on one hand, a mounting on frame lugs whose thickness may vary for example between 3.5 and 5 mm while providing a roughly constant tightening force, bearing in mind the convex shape given to the active portions of the branches 9 of the fastener. Indeed, owing to this particular shape, the contact with the adjacent surface of the frame lug always occurs under the same conditions, irrespective of the thickness of this lug, within the aforementioned limits.

Figure 5:
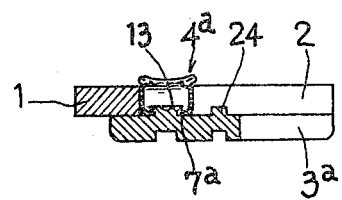
FIG. 5 is a sectional view taken on line 5—5 of FIG. 4.

In FIGS. 4 and 5, the elastically yieldable fastener 4a comprises in the end wall 7a thereof a non-circular opening which is, for example, roughly rectangular or oblong, and receives a projecting portion 13 of the support plate. This projecting portion 13 has a corresponding shape and acts, after a forming over operation, as means for fixing the fastener 4a to the plate 3a. This modification has the advantage of eliminating a rivet and facilitating an automatized manufacture. The projecting portion 13 is formed at the same time as the centering projecting portion 12.

In the embodiment shown in FIGS. 6 and 7, the support plate carries a stud 20, which is for example fixed by riveting at 21 and on which is also fixed an elastically yieldable fastener 22, here formed by a spring steel strip. This strip has, at its free end, a curved portion 23 or any other projecting portion extending toward the support plate. As in the foregoing embodiment, the support plate also has means 24 for centering it relative to the support lug.

This modified structure is very simple to use. The stud 20 is engaged in the slot or slideway 2 of the frame lug. In pursuing the movement, the elastically yieldable fastener 22 is raised and passes over the frame lug and subsequently drops behind the rear edge 1a of the lug when the support plate reaches its correct position.

As in the foregoing embodiment, the support plate is fixed to the frame lug by very simple and reliable means with no necessity to effect any untightening followed by a tightening.

There is achieved a marked advantage, in particular when mounting the derailleur on the frame lug and there is no risk of the fasteners coming away from the frame lug in the course of the various handling operations, in view of the fact that the support plate is permanently fixed to these elastically yieldable fasteners.

It will be understood that the shape of the elastically yieldable fasteners, the nature of the materials employed, the way in which these fasteners cooperate with the frame lug may be modified in many ways without departing from the scope of the invention as defined in the claims.

Having now claimed my invention what I claim as new and desire to secure by Letters Patent is:

1. A device for fixing a derailleur support on a frame lug of a bicycle, said device comprising an elastically yieldable fastener which is permanently fixed on the support and provides cooperation with the frame lug ensures that the support is maintained in position relative to the frame lug, and means carried by the support centering the support relative to the frame lug.

2. A device according to claim 1, wherein the fastener comprises a body by which body it is fixed to the support, and two diametrally opposed branches extending from said body frictionally cooperating with the frame lug.

3. A device according to claim 2, wherein the body comprises an end wall and two portions of a cylinder and two notches separating the two portions of a cylinder.

4. A device according to claim 2, wherein the two branches include a convex surface that come into contact with a rear face of the frame lug.

5. A device according to claim 4, wherein said convex surface extends on an arc of a circle centered on an axis of means fixing the fastener on the support.

6. A device according to claim 2, wherein the two branches include rounded edge portions which facilitate the engagement of the branches on the frame lug.

7. A device according to claim 2, wherein the two branches include rounded corner portions which facilitate the engagement of the branches on the frame lug.

8. A device according to any one of the claims 2 to 8, wherein rivets means fix the elastically yieldable fastener to the support.

9. A device according to any one of the claims 2 to 8, comprising, for fixing the elastically yieldable fastener to the support, a projecting portion provided on the support, and an aperture formed in an end wall of the fastener, the projecting portion extending into said aperture and having a formed-over portion for retaining the projecting portion in said aperture.

* * * * *

UNITED STATES PATENT AND TRADEMARK OFFICE
CERTIFICATE OF CORRECTION

PATENT NO. : 4,407,599

DATED : October 4, 1983

INVENTOR(S) : Roger Huret, deceased

It is certified that error appears in the above-identified patent and that said Letters Patent is hereby corrected as shown below:

Column 2, line 7, change "," to --;--.

Column 4, line 29, change "2 to 8," to -- 2 to 7, --.

Column 4, line 32, change "2 to 8," to --2 to 7,--.

Signed and Sealed this

Tenth Day of January 1984

[SEAL]

Attest:

GERALD J. MOSSINGHOFF

Attesting Officer

Commissioner of Patents and Trademarks